US010433631B2

United States Patent
Ohlgart

(10) Patent No.: US 10,433,631 B2
(45) Date of Patent: Oct. 8, 2019

(54) HAIRPIECE HOLDER

(71) Applicant: SignatureShelley, LLC, Flint, MI (US)

(72) Inventor: Shelley M. Ohlgart, Bloomfield Hills, MI (US)

(73) Assignee: SignatureShelley, LLC, Flint, MI (US)

( * ) Notice: Subject to any disclaimer, the term of this patent is extended or adjusted under 35 U.S.C. 154(b) by 0 days.

(21) Appl. No.: 15/718,462

(22) Filed: Sep. 28, 2017

(65) Prior Publication Data

US 2019/0090615 A1 Mar. 28, 2019

(51) Int. Cl.
| | |
|---|---|
| *A45D 44/02* | (2006.01) |
| *F16B 47/00* | (2006.01) |
| *F16M 13/02* | (2006.01) |
| *F16B 2/10* | (2006.01) |
| *A45D 8/20* | (2006.01) |
| *A41G 5/00* | (2006.01) |
| *A41G 3/00* | (2006.01) |
| *A45D 8/00* | (2006.01) |

(52) U.S. Cl.
CPC ............. *A45D 44/02* (2013.01); *A45D 8/20* (2013.01); *F16B 2/10* (2013.01); *F16B 47/00* (2013.01); *F16M 13/022* (2013.01); *A41G 3/0025* (2013.01); *A41G 5/008* (2013.01); *A41G 5/0086* (2013.01); *A45D 2008/002* (2013.01)

(58) Field of Classification Search
CPC ........ A45D 44/02; F16M 13/022; F16B 2/10; F16B 47/00; A41G 3/0025; A41G 5/008
USPC ................ 248/205.5, 339, 340; 211/13.1; 220/4.22, 4.23, 4.29, 531, 244, 263, 283, 220/810, 842, 843; 206/470, 251; 217/57

See application file for complete search history.

(56) References Cited

U.S. PATENT DOCUMENTS

| | | | | |
|---|---|---|---|---|
| 5,615,765 | A | * 4/1997 | Roericht | A45C 11/04 206/45.23 |
| 5,655,677 | A | * 8/1997 | Fratello | B65G 51/06 220/4.22 |
| 6,131,760 | A | * 10/2000 | Huang | B65D 25/04 220/326 |
| 6,612,440 | B1 | * 9/2003 | Agulnik | A45C 11/20 206/521.2 |
| 6,681,779 | B2 | 1/2004 | Stachowski | |
| 7,168,432 | B1 | 1/2007 | Brumfield | |
| 7,631,648 | B2 | 12/2009 | Kirby | |

(Continued)

FOREIGN PATENT DOCUMENTS

TW        M380042 U        5/2010

OTHER PUBLICATIONS

Hair Works 4-in-1 Hair Extension Style Caddy, www.amazon.com, retrieved Jan. 23, 2017 (6 pages).

(Continued)

*Primary Examiner* — Muhammad Ijaz
(74) *Attorney, Agent, or Firm* — Bejin Bieneman PLC

(57) ABSTRACT

A hairpiece holder that includes a first portion and a second portion. The first portion may include one or more protrusions extending therefrom, which protrusion(s) may be adapted to position at least one hairpiece relative to the first portion. The second portion may be couplable to the first portion. And when the first and second portions are in a closed position, the first and second portions may define a sealed cavity which encloses the protrusion(s).

20 Claims, 9 Drawing Sheets

(56) References Cited

U.S. PATENT DOCUMENTS

| | | | |
|---|---|---|---|
| D629,608 S * | 12/2010 | Hong | D3/294 |
| 7,946,297 B1 | 5/2011 | Fernandez | |
| 8,181,658 B2 | 5/2012 | Hsu | |
| D662,320 S * | 6/2012 | De Leo | D3/201 |
| D768,337 S * | 10/2016 | Treb | D28/10 |
| 2003/0159962 A1 | 8/2003 | Heo | |
| 2007/0251540 A1 | 11/2007 | Cheung | |
| 2008/0230085 A1 | 9/2008 | Kirby | |
| 2009/0120451 A1 * | 5/2009 | Kenna | A41G 5/008 |
| | | | 132/201 |
| 2010/0101595 A1 | 4/2010 | Glenn, Jr. et al. | |
| 2012/0125356 A1 * | 5/2012 | Alex | A41G 5/004 |
| | | | 132/201 |
| 2012/0304377 A1 | 12/2012 | Reile | |
| 2014/0191634 A1 | 7/2014 | Smiley | |
| 2014/0283869 A1 | 9/2014 | Sonstegard et al. | |
| 2015/0351574 A1 * | 12/2015 | Eslami | A47G 29/08 |
| | | | 206/388 |
| 2016/0186924 A1 | 6/2016 | Tracey | |
| 2016/0298664 A1 * | 10/2016 | Benson, Jr. | F16B 2/10 |
| 2019/0090615 A1 * | 3/2019 | Ohlgart | A45D 44/02 |

OTHER PUBLICATIONS

Image of "Hair Works 4-in-1 Hair Extension Style Caddy" product purchased by Applicant.
International Search Report and Written Opinion of International Searching Authority in PCT/US2018/053408 dated Dec. 13, 2018.

* cited by examiner

HAIRPIECE HOLDER

BACKGROUND

Hair extensions may be washed, blow-dried, and/or dyed. The strands of hair with respect to certain extensions are coupled together using certain adhesive products. Examples of adhesive products include a glue, a crystal-polymer based product, a keratin-based product, a plant or petroleum-based product, or a combination thereof.

DETAILED DESCRIPTION

Figure 1:
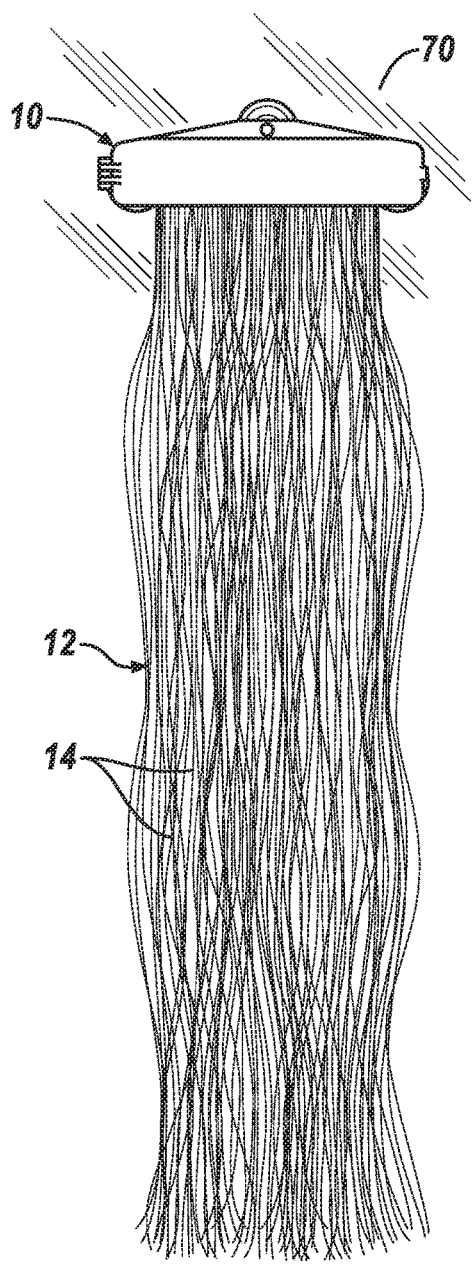
FIG. 1 is a front view of a hairpiece holder in a closed position, holding a hairpiece adjacent a vertical workpiece surface.
Figure 2:
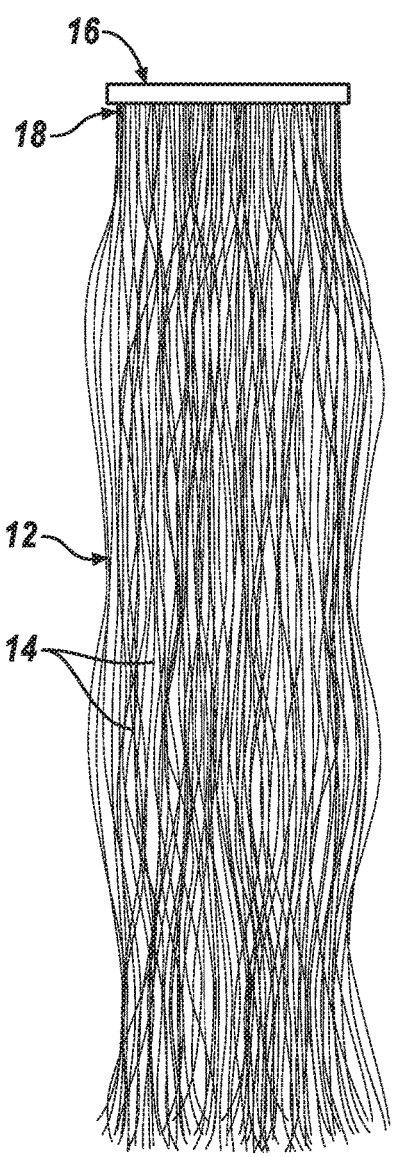
FIG. 2 is an example of a hairpiece.
Figure 3:
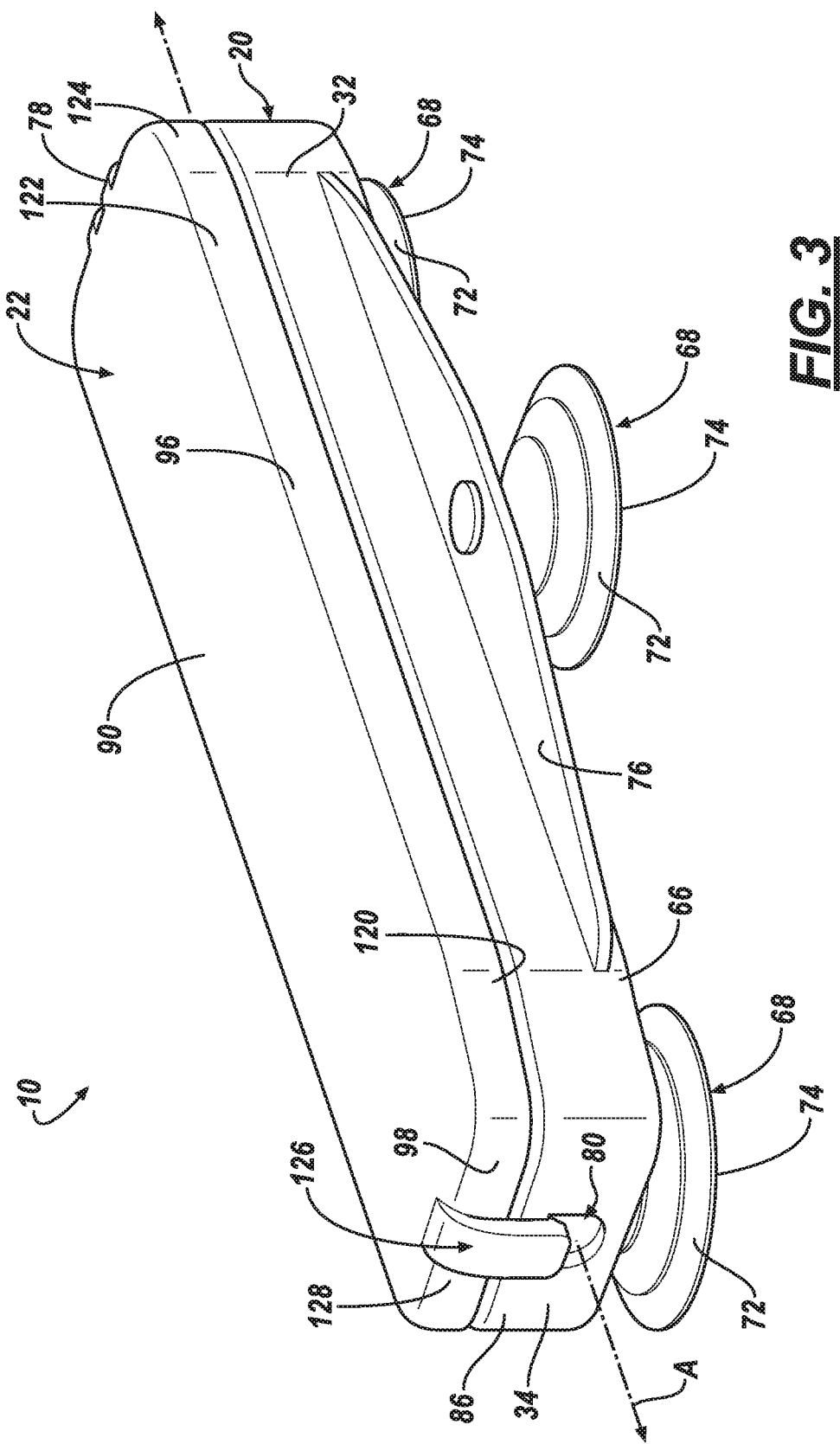
FIG. 3 is a perspective view of the hairpiece holder, in the closed position.

As described herein, according to one non-limiting example, a hairpiece holder for holding hair is described. The holder may include: a first portion having one or more protrusions extending therefrom, which protrusion(s) are adapted to position at least one hairpiece relative to the first portion; and a second portion couplable to the first portion, wherein, when the first and second portions are in a closed position, the first and second portions define a sealed cavity which encloses the protrusion(s).

As described herein, according to another non-limiting example, a hairpiece holder for holding hair is described. The holder may include: a base; a lid coupled to the base, wherein the base or the lid comprises one or more protrusions extending therefrom, which protrusion(s) are adapted to retain a position of at least one hairpiece relative to the respective portion; a seal ring interposed between the base and lid, when the base and lid are in a closed position; and a sealed cavity formed by the base and lid, which cavity encloses the protrusion(s).

With reference to the figures listed above, wherein like numerals indicate like parts throughout the several views, there is shown a hairpiece holder 10 for holding hairpieces while washing, drying, and/or coloring them. As used herein, a hairpiece 12 is a plurality of human or synthetic strands of hair 14 (e.g., a so-called tress) which are coupled together using an adhesive coupling 16 (i.e., a dab of cured adhesive or glue, or coupling using one or more adhesive strips). Typically, the adhesive coupling 16 is located at one end 18 of the strands of hair 14. Non-limiting examples of hairpieces include so-called hair-extensions, wigs, and hairpieces, just to name a few examples. Washing, blow-drying, applying colors or dyes, and the like can deteriorate the adhesive coupling 16. And as will be described in more detail below, the hairpiece holder 10 described herein inhibits such fluids, dyes, etc. from contacting the coupling 16 while a hair-stylist washes, dries, or treats the hair 14 of the hairpiece 12 and thereby inhibits such degradation.

The hairpiece holder 10 comprises a first portion or base 20 and a second portion or lid 22 which, when located adjacent one another, form and define a sealed cavity 24. The base 20 may comprise an elongated bottom 26 and a plurality of walls 28, 30, 32, 34 extending from a first side 36 of the bottom 26 the bottom 26 and walls 28-34 forming a channel 38. And according to one example, a length of the base 20 may be 3-14 inches long and/or a width thereof may be between 2-4 inches wide (e.g., this length may permit the holder 10 to fit within and be coupled to an inner surface of a conventional salon sinks). Further, according to at least one example, a volume of the channel 38 may be between 6-56 cubic inches. Of course, these are merely examples, and other examples exist (e.g., in at least one example, the base 20 is approximately 10 inches long and approximately 2 inches wide).

A height of the walls 28-34 may be uniform so that ends 48, 50, 52, 54 of respective walls 28-34 collectively define a circumferential edge 56 of the base 20. In at least one example, a thickness of one longitudinal wall (e.g., one of wall 28 or wall 32) may be thicker than the remaining walls. For instance, in the illustrated example, wall 32 is shown as thicker than walls 28, 30, 34.

Figure 4:
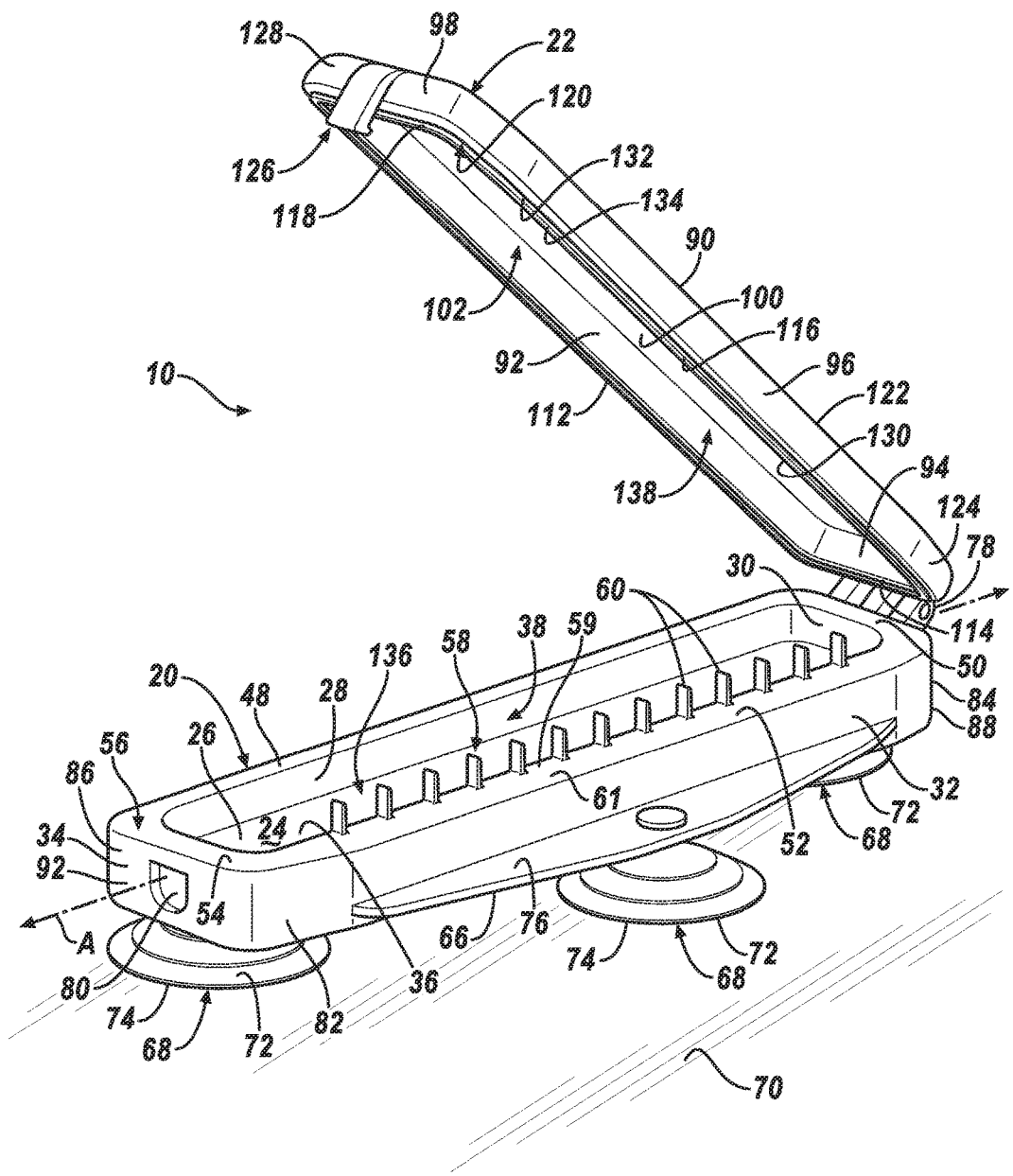
FIG. 4 is a perspective view of the hairpiece holder, in an open position.
Figure 5:
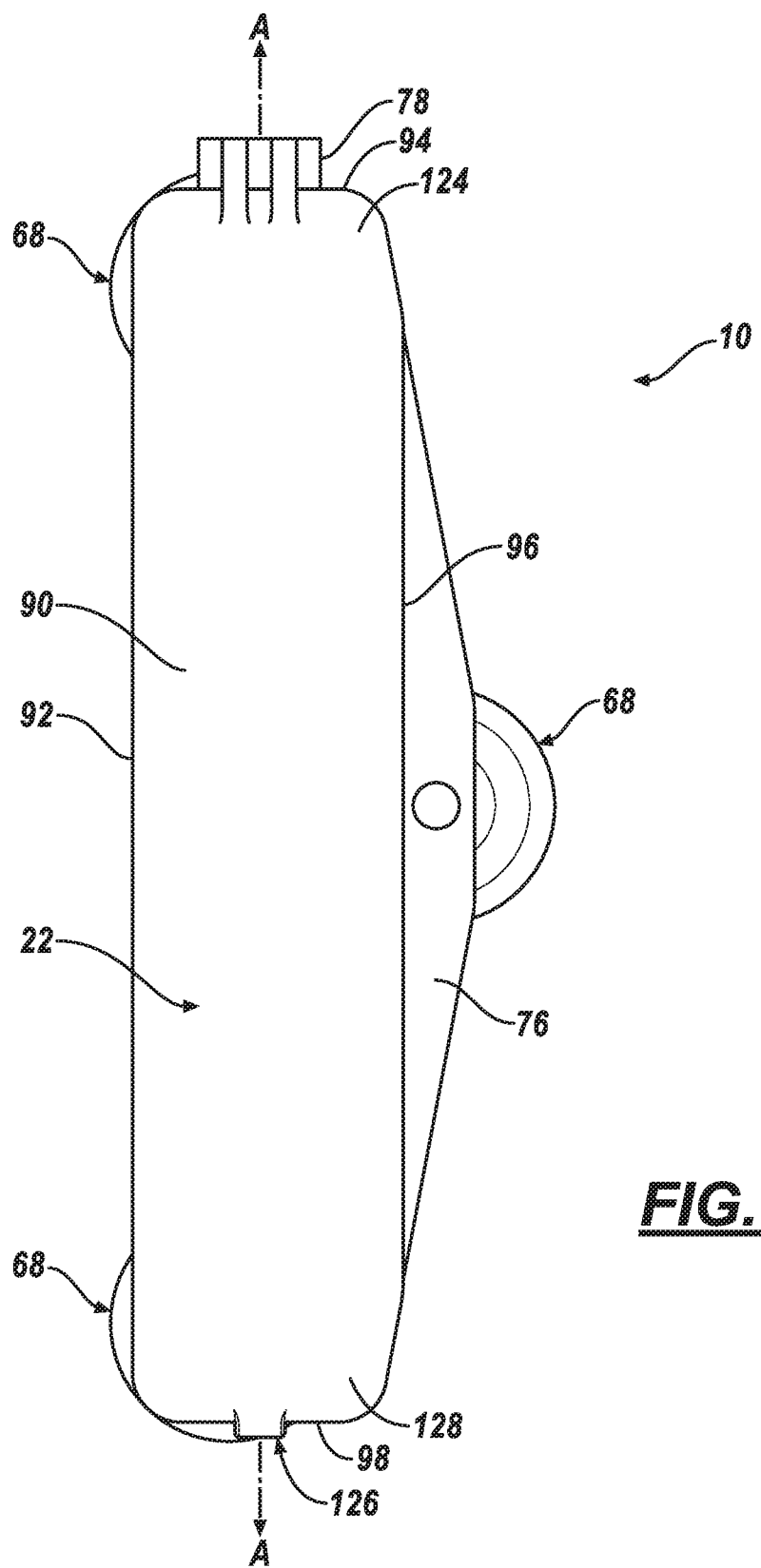
FIG. 5 is a top view of the hairpiece holder, in the closed position.

According to at least one example, one of ends 48, 52 of respective walls 28, 32 may have one or more protrusions 58 extending outwardly therefrom. For example, FIG. 4 illustrates a plurality of protrusions 58 extending from thicker wall 32. More particularly, the protrusions 58 may extend from an inboard region 59 of end 52 (of wall 32). The protrusion(s) 58 may comprise teeth or tines 60 which may or may not be evenly spaced along a portion of a length of end 52. In some examples, the protrusions 58 are axially aligned and parallel to axis A. The protrusions 58 may be spaced inboard (e.g., closer to channel 38 so that the protrusions 58 are located within the cavity 24 of holder 10 when the lid 22 is in the closed position; further, by spacing the protrusions 58 on the inboard region 59, an outboard region 61 of end 52 may be available for a sealing engagement between the base 20 and lid 22, as will be described in greater detail below.

As will be explained in more detail below, a hair stylist may use the protrusions 58 to retain a hairpiece by locating the adhesive coupling 16 of the hairpiece 12 within the cavity 24 so that the strands of hair 14 extend through the protrusions 58 and dangle outside of the hairpiece holder 10 (e.g., dangle vertically as shown in FIG. 1). Thereafter, the stylist may close the lid 22. In this manner, when the hairpiece 12 is pulled and handled by the stylist, the hairpiece 12 does not move relative to the holder 10—e.g., as the coupling 16 may abut against the protrusions 58 within the cavity 24 thereby inhibiting the hairpiece 12 from slipping out of the holder 10. The hairpiece 12 may be held in place by gravity, the circumferential sealing engagement, or a combination thereof.

Figure 8:
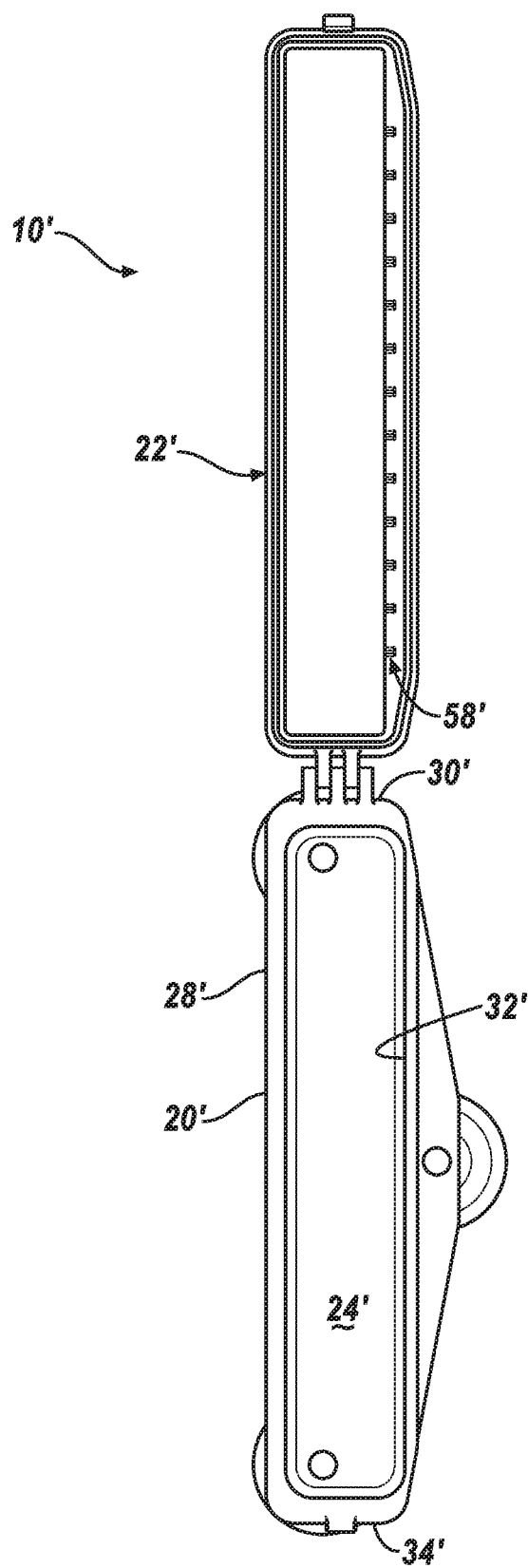
FIG. 8 is another example of a hairpiece holder, having protrusions on a lid thereof.

This arrangement of protrusions 58 is merely one implementation. In other examples, the protrusion(s) 58 could extend from the lid 22 in addition to or instead of extending from the base 20. See for example FIG. 8 which illustrates holder 10' having protrusions 58' extending from lid 22' (in this example, wall 32' may be spaced farther outboard of wall 28' and/or may be thinner than wall 32 (e.g., having a thickness that approximates that of walls 28', 30', and 34' e.g., thereby providing space for the protrusions 58' to fit within the cavity 24' when the holder 10' is in the closed position. Further, other protrusion examples exist as well. For instance, a distal end of each tooth 60 could be bent or curved toward the cavity 24—e.g., to further aid in retaining a hairpiece position. Still other examples exist as well.

Figure 6:
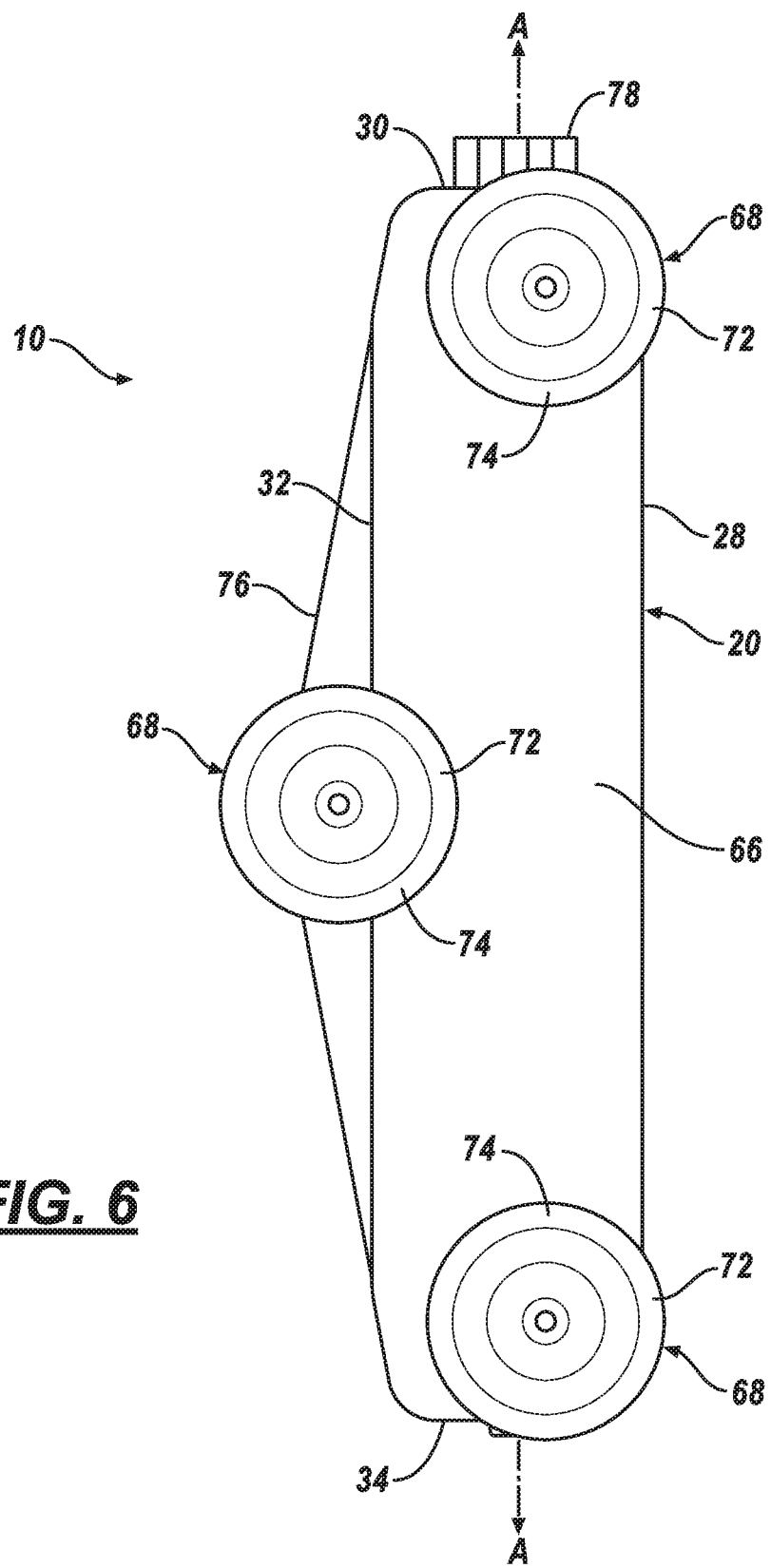
FIG. 6 is a bottom view of the hairpiece holder, in the closed position.
Figure 7:
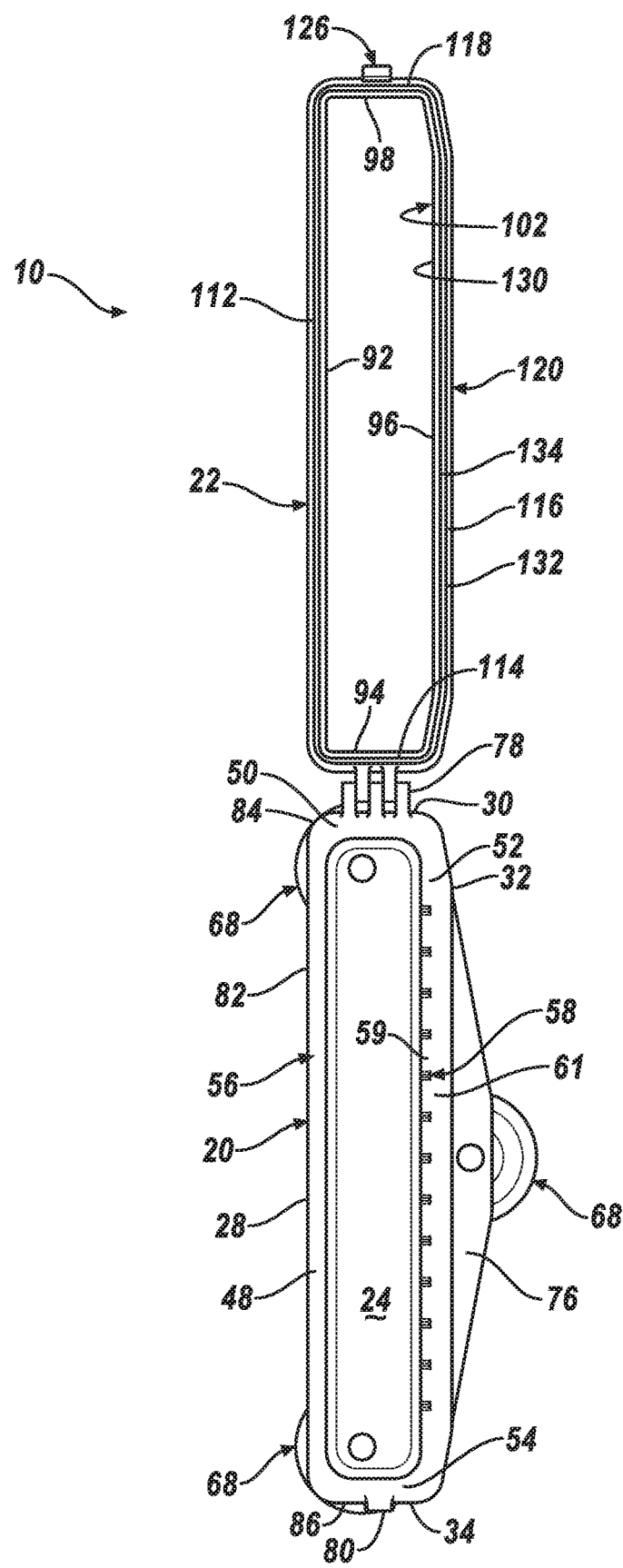
FIG. 7 is a top view of the hairpiece holder, in the open position.

Returning to FIGS. 4 and 6, a second side 66 of the base 20 (opposite the first side 36) may be coupled to one or more feet 68 which extend outwardly therefrom. The feet 68 may be used to couple the holder 10 to a workpiece surface 70. For example, the feet 68 may be used to couple the holder 10 to a mirror, wash basin, or other vertical workpiece surface so that the hair 14 of the hairpiece 12 dangles therebelow. Of course, the feet 68 could be coupled to horizontal or inclined surfaces as well. In at least one example, the feet 68 comprise suction cups 72 having an open end 74 facing away from base 20. In other examples, one or more feet 68 could comprise a hook-and-loop material (e.g., Velcro), a disposable adhesive pad, or the like— e.g., adapted to couple the base 20 to the workpiece surface 70.

According to one example, the feet 68 are arranged according to an offset arrangement. As used herein, an offset arrangement of feet 68 means the feet 68 are not arranged in a straight line. For example, while the feet 68 may be coupled to and axially spaced along the length of the base 20, at least one foot 68 may be closer to wall 28 (or 32) than the other feet 68 (e.g., one foot 68 may be a different distance from axis A than the others). In at least one example (e.g., as illustrated), a flange 76 may extend radially outwardly of base 20 (e.g., from wall 32), and at least one of the feet 68 may be coupled to and extend from the flange 76 (e.g., away from second side 66; however, this is merely an example and other implementations also exist. Thus, for example, having several feet 68 in the offset arrangement, when the holder 10 is coupled to vertical workpiece surface 70, the holder 10 is less likely to pivot downwardly as a stylist attempts to wash, handle, or otherwise pull on the hairpiece 12. The illustrations show three feet 68; this is merely an example. Other quantities of feet may be used instead.

As shown in FIG. 4, base 20 also may comprise a first coupling feature 78 and a second coupling feature 80 which collectively can be used to retain the base 20 and lid 22 in a closed position. According to one example, the first coupling feature 78 is a hinge which is coupled to lid 22 (as described below) and also to an outer surface 82 of the base 20 at an end 84. Thus, in one instance, feature 78 couples the base 20 and lid 22 together also when the holder 10 is in an open position. According to another example, the second coupling feature 80 is a clip formed in part as a depression in the outer surface 82 of base 20 at an end 86 (which is opposite the end 84). Here, when feature 80 is in a latched position, the holder 10 may be in the closed position, and when feature 80 is in an unlatched position, the holder 10 may be in the open position. Other non-limiting examples of first and/or second coupling features 78, 80 include a latch, a clamp, a snap, a pivotable hook, a post, a tether, and the like Turning now to the lid, the lid 22 may comprise an elongated top 90 and a plurality of walls 92, 94, 96, 98 extending from a first side 100 of the top 90—the top 90 and walls 92-98 also may form a channel 102. A length of the lid 22 may correspond with a length of the base 20; more particularly, the ends 48, 50, 52, 54 of respective walls 28, 30, 32, 34 may correspond and respectively abut with respective ends 112, 114, 116, 118 of walls 92, 94, 96, 98. More particularly still, the outboard region 61 (of wall 32) may abut end 116 (of wall 96). The height of the walls 92-98 may be uniform so that ends 112, 114, 116, 118 collectively define a circumferential edge 120 of the lid 22. And according to one example, a length of the lid 22—which corresponds to a length of the base 20—also may be 3-14 inches long and/or a width thereof may be between 2-4 inches wide. Further, according to at least one example, a volume of the channel 102 may be between 6-56 cubic inches. Again, these dimensions are merely examples, and other examples exist (e.g., in at least one example, the lid 22 is approximately 10 inches long and approximately 2 inches wide).

The lid 22 may be couplable to the first and/or second coupling features 78, 80, described above. For instance, when feature 78 comprises a hinge, the hinge also may be coupled to an outer surface 122 of lid 22 at an end 124 thereof. In other examples, end 124 may comprise a third coupling feature—e.g., instead of being coupled to the hinge. In at least one example, lid 22 comprises a fourth coupling feature 126 which may extend from the outer surface 122 of lid 22 at an end 128. In at least one example, feature 126 comprises a latch that correspondingly couples to the second coupling feature 80 (e.g., a clip). The third and/or fourth coupling features may be similar or identical to those features described above with respect to the first and/or second coupling features 78, 80; therefore, these features will not be re-described here.

Thus, in at least one example, lid 22 may pivot with respect to base 20 at first coupling feature 78 (e.g., a hinge or similar device). In this manner, lid 22 may be coupled to the base 20 in both the open and closed positions. When end 128 of the lid 22 is moved toward the base 20 (and to the closed position), the second and fourth coupling features 80, 126 may engage to the latched position. In the latched position, one or more components of the features 80, 126 resiliently may deform and/or be biased (e.g., to retain the engagement thereof). A user of the holder 10 may displace, bend, or otherwise move one or both coupling features 80, 126 in order to change the holder to the unlatched position. When this occurs, components may resiliently return to their original shape so that the features 80, 126 may be used again to re-latch the features 80, 126 (and also later re-form a sealing engagement between the base 20 and lid 22).

When the hairpiece holder 10 is moved from the open position to the closed position, the protrusions 58 may be located adjacent to an inner surface 130 of wall 96 (of lid 22). Thus, in at least the illustrated example, strands of hair 14 may be trapped between the protrusions 58 and wall 96. Further, the adhesive coupling 16 of the hairpiece 12 may be located within the cavity 24 (e.g., in the channel 38, channel 102, or a combination thereof). As the circumferential edges 56, 120 may abut one another in a sealing engagement, the adhesive coupling 16 may be isolated from contact with water, detergents, and other chemicals which may deteriorate the adhesive material.

According to one example, the edge 120 may have a circumferential groove 132, and the groove 132 may carry a seal ring 134 which further may promote a sealing engagement. A cross-section (not shown) of the ring 134 may have any suitable shape (e.g., rounded, rectangular, flat (as a gasket), etc.). Further, the seal ring 134 may comprise any suitable material; non-limiting examples include polytetrafluoroethylene (PTFE), nitrile rubber, silicone, and other polymers. In the closed position, the seal ring 134 may be interposed between and may resiliently deform against the circumferential edges 56, 120 of the base 20 and lid (respectively) in a sealing engagement. As used herein, a sealing engagement means that leakage of fluids is inhibited from passing between the base 20 and lid 22. Thus, in at least one example, this sealing engagement may be based on a compression of the seal ring 134 therebetween. In at least one other example, the sealing engagement is based (at least partially) on a press-fit engagement of a portion of base 20 and/or lid 22, as described more below.

As also described in more detail below, neither the bottom 26, the top 90, nor the walls 28-34, 92-98 may have a pass-through hole, a pass-through slot, etc. which, in the closed position, permits fluid communication between the inner surface 136 (base 20) and inner surface 138 (lid 22) of cavity 24 and an outer surface 122 of the lid 22 or outer surface 82 of the base 20. For example, holder 10 may not have drainage holes or the like as the holder 10 is adapted to inhibit moisture, detergents, dyes, and the like from entering the cavity 24. Furthermore, as discussed above, a press-fit engagement between circumferential edges 56, 120 may inhibit moisture from entering the cavity 24. Still further, the seal ring 134 further may inhibit moisture, detergents, dyes, and the like from seeping between circumferential edges 56, 120. As described above, in this manner, the holder 10 may inhibit degradation of the adhesive coupling 16 which binds the hairs 14 of the hairpiece 12 together—thereby increasing the useful life of the hairpiece 12 which is typically desirable to a wearer thereof.

The base 20 and lid 22 may comprise any suitable rigid plastic or polymeric material. For example, the base 20 and lid 22 may comprise any low-density, medium-density, or high-density polyethylene (e.g., LDPE, MDPE, HDPE). In at least one example, the base 20 and lid 22 can comprise an anti-static plastic (e.g. such as polyacetylene, polyphenylene vinylene, poly-pyrrole, etc.) so that static charge on hairpiece 12 is drawn to the holder 10—e.g., when the holder 10 is in the closed position and is holding the hairpiece 12 while a stylist blow-dries such hairpiece.

Other examples of the hairpiece holder exist as well. For example, the lid 22 could comprise a resilient material so that all or part of the lid deforms in the closed position forming a sealing engagement.

Figure 9:
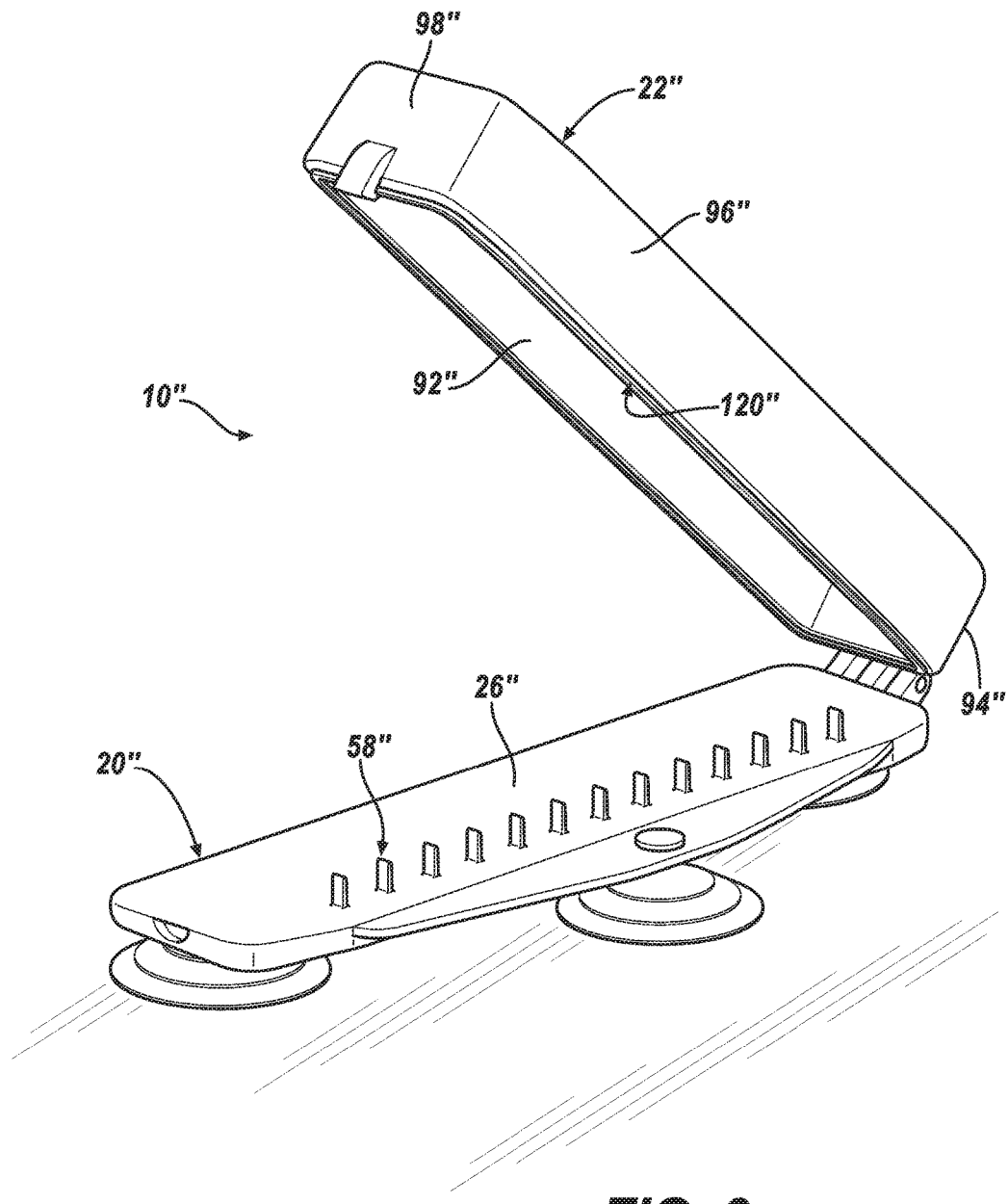
FIG. 9 illustrates another example of a hairpiece holder, in an open position.

In still other examples (such as that shown in FIG. 9), a base 20" may not comprise walls 28-34. For example, protrusions 58" could extend from a bottom 26" of base 20" and instead circumferential edge 120" of respective walls 92", 94", 96", 98" (carrying seal 134") may abut the bottom 26" in a sealing engagement.

It should be appreciated that in still other examples, circumferential edge 56 of the base 20 could have a circumferential groove (e.g., instead of lid 22 having groove 132). Thus, base 20 may carry a circumferential seal (e.g., similar to seal 134).

Figure 10:
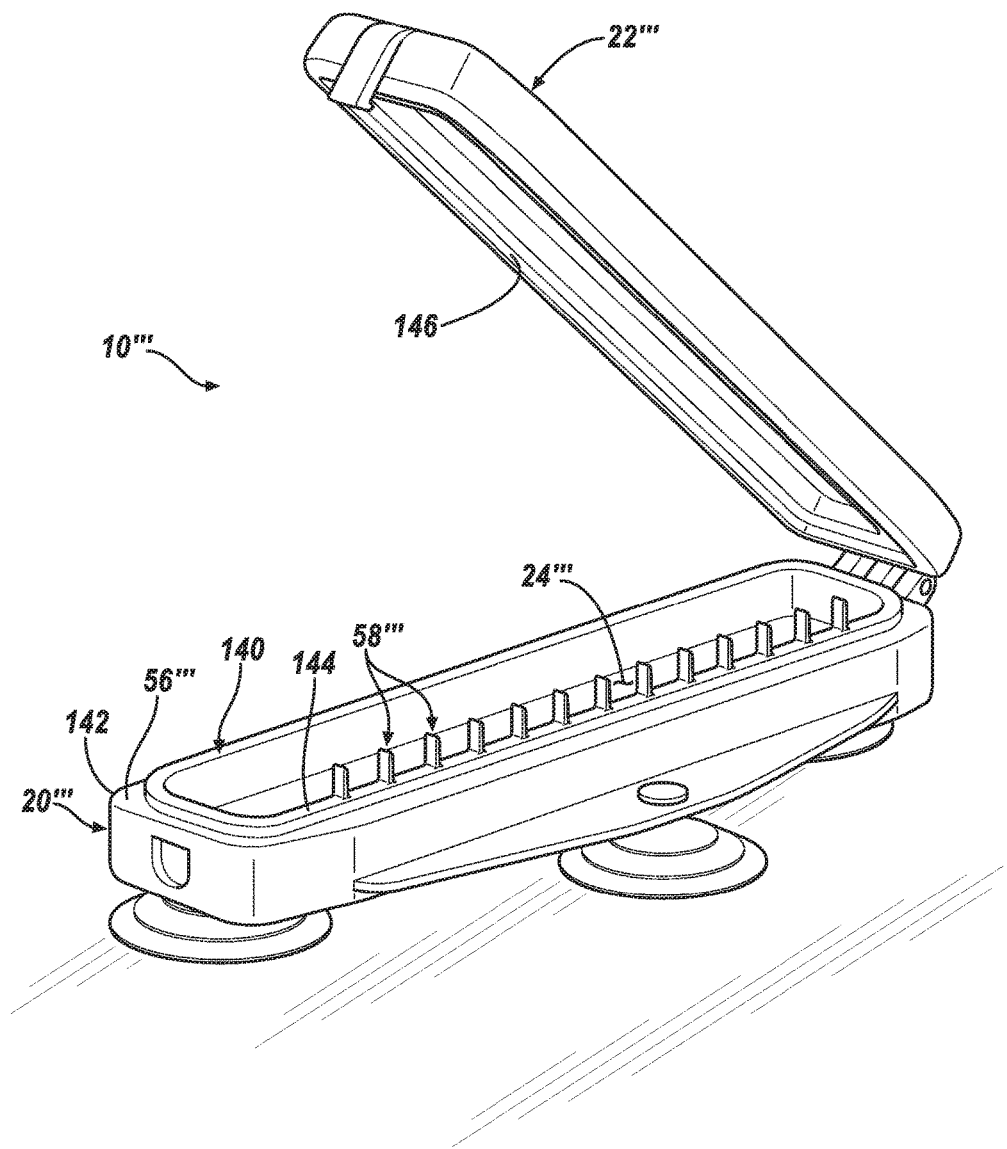
FIG. 10 illustrates yet another example of a hairpiece holder, in an open position.

In yet other example of hairpiece holder 10''' (such as that shown in FIG. 10), a base 20''' may comprise a barrier wall 140 extending outwardly from circumferential edge 56'''. For example, the wall 140 may be spaced radially inwardly from a periphery 142 of the edge 56'. Protrusions 58' may extend outwardly from a top 144 of wall 140. In this example, lid 22' may comprise a counterbore 146 that extends from circumferential edge 120', wherein the counterbore 146 is shaped and sized to correspond with the wall 140 and edge 56'''e.g., so that, in a closed position, the barrier wall 140 and counterbore 146 form a sealing engagement (e.g., inhibiting the penetration of moisture, fluids, detergents, etc. into cavity 24''' formed by the base 20''' and lid 22"'). In this example, the lid 22''' may or may not carry a seal (e.g., such as seal 134 shown and discussed above).

For example, in one instance, the wall 140 and counterbore 146 may abut one another in a press-fit engagement, and any resilient deformation of one or both components may form the sealing engagement therebetween.

In another example, the hairpiece holder 10 may have more than three feet 68. For example, in some instances, the holder 10 may be longer (e.g., up to approximately 14 inches long), and additional feet 68 may be used to bear the weight of the holder 10, multiple wet hairpieces 12, etc. For example, additional suction cups may be used to retain the holder 10 to an inner surface of a salon sink.

Thus, there has been described a hairpiece holder having a first portion and a second portion. The first and/or second portions may form a sealed cavity and either (or both) portions may have one or more protrusions for positioning a hairpiece within the cavity. In a closed position and when an adhesive coupling of the hairpiece is located within the cavity, the holder may inhibit fluid contact with fluids located on an exterior of the holder.

As used herein, terminology such as up, down, left, right, vertically, horizontally, inclined, etc. should be construed as terms used to explain or illustrate relative position and/or orientation. These terms are not intended to be limiting.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. Further, words such as top, bottom, upper, lower, right, left, etc. are used for clarity and for illustrative purposes only and not intended to be limiting; further, the hairpiece holder 10 could be rotated or used in any suitable position.

The invention claimed is:

1. A hairpiece holder, comprising:
   a first longitudinal portion comprising a bottom and a plurality of walls extending from the bottom to a circumferential edge, wherein a barrier wall extends outwardly from the edge, wherein a plurality of protrusions arranged in series extends outwardly from the barrier wall; and
   a second portion couplable to the first portion, wherein, when the first and second portions are in a closed position, the first and second portions define a sealed cavity which encloses the plurality of protrusions,
   wherein the hairpiece holder is configured such that, when an adhesive coupling of a hairpiece is located in the cavity and hair of the hairpiece is located around the plurality of protrusions and when first and second portions are in the closed position, the adhesive coupling is isolated from an exterior of the hairpiece holder.

2. The holder of claim 1, wherein the plurality of protrusions includes teeth spaced from one another between a first end of the first portion and a second end thereof.

3. The holder of claim 1, wherein the plurality of protrusions is axially aligned along a length of the first portion.

4. The holder of claim 1, further comprising one or more feet coupled to the first or second portion.

5. The holder of claim 4, wherein the feet comprise suction cups having an offset arrangement.

6. The holder of claim 1, wherein the first or second portion further comprises a coupling feature to retain the first and second portions in the closed position.

7. The holder of claim 6, wherein the feature includes one or more of a clip, a latch, and a hinge.

8. The holder of claim 1, further comprising a seal ring that is positioned between the first and second portions in the closed position.

9. The holder of claim 8, wherein at least one of the first and second portions comprise the circumferential edge, wherein, in the closed position, the seal ring is positioned between the circumferential edge and the respective other portion.

10. The holder of claim 1, wherein at least one of the first or second portions comprise a channel that at least partially defines the cavity.

11. A hairpiece holder, comprising:
a base;
a lid coupled to the base,
wherein the base or the lid comprises a bottom and a plurality of walls extending from the bottom to a circumferential edge, wherein a barrier wall extends outwardly from the edge, wherein a plurality of protrusions arranged in series extends outwardly from the barrier wall;
a seal ring interposed between the base and lid, when the base and lid are in a closed position; and
a sealed cavity formed by the base and lid, which cavity encloses the plurality of protrusions,
wherein the hairpiece holder is configured such that, when an adhesive coupling of a hairpiece is located in the cavity and hair of the hairpiece is located around the plurality of protrusions and when the base and the lid are in the closed position, the adhesive coupling is isolated from an exterior of the hairpiece holder.

12. The holder of claim 11, wherein the plurality of protrusions include teeth spaced from one another between a first end and a second end of the base, between a first end and a second end of the lid, or both.

13. The holder of claim 11, wherein the plurality of protrusions are aligned in parallel with respect to a longitudinal axis of the holder.

14. The holder of claim 11, further comprising one or more feet coupled to the base.

15. The holder of claim 14, wherein the feet comprise suction cups having an offset arrangement.

16. The holder of claim 11, wherein the base or lid further comprises a coupling feature to retain the base and lid in the closed position.

17. The holder of claim 16, wherein the feature includes one or more of a clip, a latch, and a hinge.

18. The holder of claim 11, wherein at least one of the base or the lid comprise the circumferential edge, wherein, in the closed position, the seal ring is positioned between the circumferential edge and the respective other portion.

19. The holder of claim 11, wherein the seal ring is located in a circumferential groove of the base or lid.

20. The holder of claim 11, wherein at least one of the base or the lid comprise a channel that at least partially defines the cavity.

* * * * *